United States Patent
Kil et al.

(10) Patent No.: US 12,440,928 B2
(45) Date of Patent: Oct. 14, 2025

(54) WELDING WIRES WITH HIGH IMPACT TOUGHNESS

(71) Applicant: The ESAB Group, Inc., North Bethesda, MD (US)

(72) Inventors: Woong Kil, Changwon (KR); Woo Sung Yang, Changwon (KR); Young Joon Kim, Changwon (KR)

(73) Assignee: THE ESAB GROUP, INC., North Bethesda, MD (US)

( * ) Notice: Subject to any disclaimer, the term of this patent is extended or adjusted under 35 U.S.C. 154(b) by 0 days.

(21) Appl. No.: 18/474,326

(22) Filed: Sep. 26, 2023

(65) Prior Publication Data
US 2024/0017360 A1 Jan. 18, 2024

Related U.S. Application Data

(63) Continuation of application No. PCT/US2022/022477, filed on Mar. 30, 2022.
(Continued)

(51) Int. Cl.
*B23K 35/02* (2006.01)
*B23K 35/30* (2006.01)
(Continued)

(52) U.S. Cl.
CPC ...... *B23K 35/0266* (2013.01); *B23K 35/3093* (2013.01); *C22C 38/002* (2013.01);
(Continued)

(58) Field of Classification Search
CPC ............ B23K 35/0266; B23K 35/3093; C22C 38/002; C22C 38/04; C22C 38/06; C22C 38/08
(Continued)

(56) References Cited

U.S. PATENT DOCUMENTS 4,510,374 A * 4/1985 Kobayashi ......... B23K 35/0266
219/146.24
4,571,480 A 2/1986 Sakai et al.
(Continued)

FOREIGN PATENT DOCUMENTS

AU 2005202021 A1 5/2006
CA 2727751 A1 12/2009
(Continued)

OTHER PUBLICATIONS

Notification of Transmittal of International Search Report and International Search Report and Written Opinion for International Patent Application No. PCT/US2022/022477 mailed Jun. 21, 2022, 11 pages.
(Continued)

*Primary Examiner* — Steven W Crabb
*Assistant Examiner* — Dilnessa B Belay
(74) *Attorney, Agent, or Firm* — Edell, Shapiro & Finnan, LLC

(57) ABSTRACT

A welding wire is disclosed including a ferrous metal welding material and a flux material including flux ingredients. The flux ingredients include, in weight percent based on the total weight of the welding wire: no greater than 1.91 aluminum, no greater than 1.02 manganese, less than 1.50 magnesium, and no greater than 0.02 rare earth metal oxide, where the rare earth metal oxide comprises at least 99 wt % cerium oxide based upon total weight of rare earth metal oxide. Resulting welds have a maximum diffusible hydrogen content of 5 mL/100 g or less. Resulting welds also have a Charpy V-notch toughness at −40° F. of at least 100 ft-lbs (135.6 Joules).

21 Claims, 3 Drawing Sheets

Related U.S. Application Data

(60) Provisional application No. 63/168,537, filed on Mar. 31, 2021.

(51) Int. Cl.
  *C22C 38/00* (2006.01)
  *C22C 38/04* (2006.01)
  *C22C 38/06* (2006.01)
  *C22C 38/08* (2006.01)

(52) U.S. Cl.
  CPC .............. *C22C 38/04* (2013.01); *C22C 38/06* (2013.01); *C22C 38/08* (2013.01)

(58) Field of Classification Search
  USPC ........................................................ 219/137
  See application file for complete search history.

(56) References Cited

U.S. PATENT DOCUMENTS

| | | |
|---|---|---|
| 7,812,284 B2 | 10/2010 | Narayanan et al. |
| 8,168,922 B2 | 5/2012 | Kotecki |
| 8,692,159 B2 | 4/2014 | Keegan |
| 9,029,733 B2 | 5/2015 | Barhorst et al. |
| 9,138,831 B2 | 9/2015 | Keegan |
| 9,770,789 B2 | 9/2017 | Saruwatari et al. |
| 9,844,838 B2 | 12/2017 | Barhorst et al. |
| 9,895,774 B2 | 2/2018 | Barhorst et al. |
| 10,421,160 B2 | 9/2019 | Wang |
| 10,589,388 B2 | 3/2020 | Barhorst et al. |
| 2006/0096966 A1 | 5/2006 | Munz et al. |
| 2013/0233840 A1 | 9/2013 | Keegan |
| 2014/0353288 A1* | 12/2014 | Amata .................. B23K 35/36 219/137 WM |
| 2015/0239072 A1 | 8/2015 | Barhorst et al. |
| 2019/0375056 A1* | 12/2019 | Wang ................. B23K 35/0261 |
| 2020/0215651 A1 | 7/2020 | Barhorst et al. |

FOREIGN PATENT DOCUMENTS

| | | |
|---|---|---|
| CN | 101073863 A | 11/2007 |
| CN | 100420539 C | 9/2008 |
| CN | 100488706 C | 5/2009 |
| CN | 108544137 A | 9/2018 |
| CN | 112108791 A | 12/2020 |
| JP | 2007216282 A | 8/2007 |
| JP | 5237693 B2 | 7/2013 |
| JP | 5942198 B2 | 6/2016 |
| KR | 20110090761 A | 3/2016 |
| KR | 102112161 B1 | 5/2020 |
| WO | 201713965 A1 | 1/2017 |

OTHER PUBLICATIONS

Request for the Submission of an Opinion (First Office Action) dated Jul. 24, 2025 from the Korean Intellectual Property Office with English translation, 16 pages.

* cited by examiner

WELDING WIRES WITH HIGH IMPACT TOUGHNESS

CROSS-REFERENCE TO RELATED APPLICATION

This application is a continuation of PCT/US2022/022477, filed Mar. 30, 2022, which claims priority from U.S. Provisional Patent Application Ser. No. 63/168,537, filed Mar. 31, 2021, the disclosures of which are incorporated herein by reference in their entireties.

FIELD

Embodiments of the invention generally relate to welding wires or consumable electrodes, and more particularly to an improved welding wire with low diffusible hydrogen and high Charpy V-notch impact toughness.

BACKGROUND

Self-shielded flux cored arc welding (SS-FCAW) has been widely applied to various fabrication industries since the middle of the last century. Its high efficiency and consistent bead quality can significantly reduce the fabrication time and project cost as compared to other welding methods, which is of great importance to fabrication projects in rural areas, such as transcontinental pipeline fabrication and offshore structures installation. On the other hand, due to direct air-exposure, the arc of SS-FCAW can be much harsher with more spattering than a gas-shielding welding arc. The arc disturbance also brings a negative impact in the control of diffusible hydrogen, oxygen, and nitrogen in the weld metals, and the microstructure evolution and mechanical properties of the welds.

Low diffusible hydrogen content in low carbon steel welds can greatly benefit the cracking resistance and steel fabrication cost and efficiency. In particular, minimizing the amount of diffusible hydrogen in deposited weld metal can minimize the possibility of hydrogen related cracking in the resulting weld. Improved self-shielded flux cored wires at the H8 level (i.e., electrodes or electrode-flux combinations capable of depositing weld metal with a maximum diffusible hydrogen content of 8 mL/100 g) have been developed which exhibit good welding performance with a gentle and stable arc, easy-to-command slag flow and robust mechanical properties. Even though the arc performance is designed to be close to a gas-shielding flux cored welding arc, the diffusible hydrogen content of such electrodes still remains at the H8 level, which limits its adoption in fabrication of more critical steel structures.

Attempts to reduce the diffusible hydrogen content in low carbon steel welds often involve the excessive addition of fluorides to the core mix. The problem with adding fluorides, however, is that it causes fluid slag flow and an unstable arc which may result in out of position welding. It also requires additional aluminum in the core to perform de-oxidation and de-nitridation. As a result, excessive aluminum is retained in the weld, causing grain coarsening and resulting in poor Charpy V-notch impact toughness.

SUMMARY

A welding wire comprises a ferrous metal material and a flux material including flux ingredients. The flux ingredients may comprise, in weight percent based on the total weight of the welding wire: no greater than 1.91 aluminum, no greater than 1.02 manganese, less than 1.50 magnesium, and no greater than 0.02 rare earth metal oxide. The rare earth metal oxide comprises at least 99 wt % cerium oxide based upon total weight of rare earth metal oxide.

In addition, a flux composition for a welding wire comprises the following core ingredients, based on the total weight of the welding wire: no greater than 1.91 aluminum, no greater than 1.02 manganese, less than 1.50 magnesium, and no greater than 0.02 rare earth metal oxide. The rare earth metal oxide comprises at least 99 wt % cerium oxide based upon total weight of rare earth metal oxide.

The welding wire may comprise a flux cored welding wire, in which the metal welding material comprises a metal sheath, and the flux material comprises a flux core within the metal sheath.

The welding wire may also be capable of yielding a weld having a diffusible hydrogen level of 5 ml/100 g or less and a Charpy V-notch toughness at −40° F. of at least 100 ft-lbs (135.6 Joules).

The above and still further features and advantages of the present invention will become apparent upon consideration of the following detailed description of specific embodiments thereof.

BRIEF DESCRIPTION OF THE DRAWINGS

The accompanying drawings illustrate preferred embodiments of the disclosed method so far devised for the practical application of the principles thereof, and in which.

DETAILED DESCRIPTION

Figure 1:
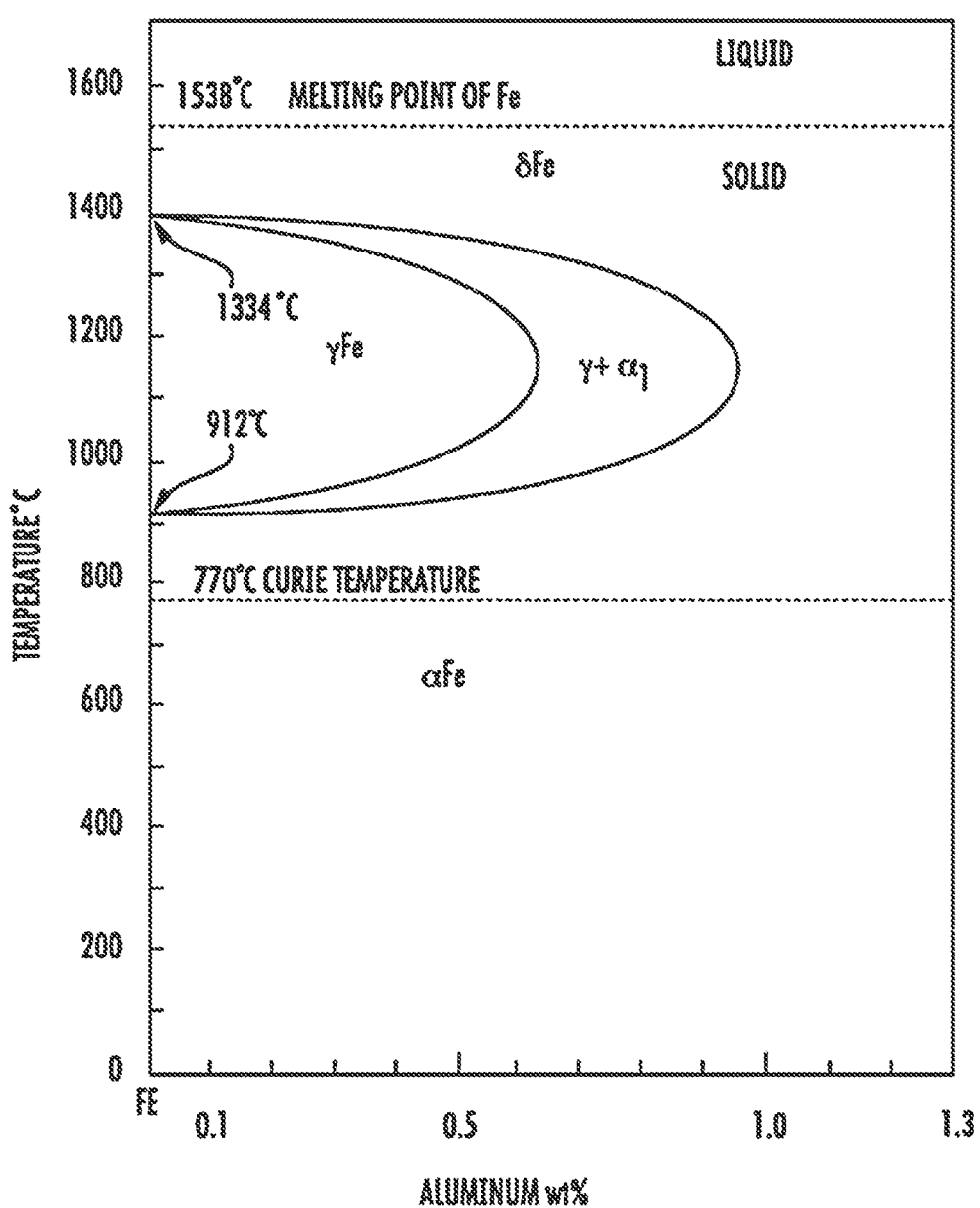
FIG. 1 is a phase diagram of Fe—Al.

Various welding wire embodiments are described in this specification to provide an overall understanding of the invention. It is understood that the various embodiments described in this specification are non-limiting and non-exhaustive. Thus, the invention is not limited by the description of the various non-limiting and non-exhaustive embodiments disclosed in this specification. In appropriate circumstances, the features and characteristics described in connection with various embodiments may be combined with the features and characteristics of other embodiments. Such modifications and variations are intended to be included within the scope of this specification. As such, the claims may be amended to recite any steps, elements, limitations, features, and/or characteristics expressly or inherently described in, or otherwise expressly or inherently supported by, this specification. Further, Applicants reserve the right to amend the claims to affirmatively disclaim steps, elements, limitations, features, and/or characteristics that are present in the prior art regardless of whether such features are explicitly described herein. Therefore, any such amendments comply with the requirements of 35 U.S.C. § 112, first paragraph, and 35 U.S.C. § 132(a). The various embodiments disclosed and described in this specification can comprise, consist of, and/or consist essentially of the elements, limitations, features, and/or characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", if and as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Described herein are consumable electrodes or welding wires which comprise a flux composition and a metal welding material. The welding wires can be of any suitable type including, without limitation, flux coated welding wires and flux cored welding wires, flux cored arc welding (FCAW) wires including self-shielded FCAW wires, etc. The welding wires and flux compositions for such wires are useful for high strength welding applications, where the welding wires have a low diffusible hydrogen content and excellent all-positional welding performance coupled with robust mechanical properties. The welding wires described herein can provide a diffusible hydrogen content that is at or below the 5 ml/100 g level (i.e. the H5 level) and that is equivalent to the diffusible hydrogen content achievable using a gas-shielding weld. Further, the welding wires described herein can provide a weld having a high Charpy V-notch impact toughness. While the example embodiments described herein are self-shielded flux cored welding wires, any other suitable welding wires including a flux composition and a metal welding material can also be utilized with the flux compositions as noted herein.

Self-shielded flux cored welding produces unique characteristics of weld metal microstructure and distribution. In addition to conventional microstructural constituents, including ferrite, ferrite as a second phase aligned, acicular ferrite, and the like, another type of second phase ferrite has been found in a weaved morphology. As described in U.S. Pat. No. 10,421,160, the microstructural characteristics of an E71T8-Ni1 type weld were investigated by changing major alloying elements of Mn and Al from 1.0-1.5 wt % and 0.7-0.9 wt %, separately. It was determined that increasing an amount of both weaved ferrite and acicular ferrite benefits the Charpy V-notch impact toughness of self-shielded FCAW welds that were dominated by ferrite. However, having such a predominant ferrite composition in welds, and with a low manganese content (i.e., as low as 0.7%), can cause fluctuations in the Charpy V-notch impact toughness at −40° F. Therefore, it is important to control the alloying of manganese and aluminum in the welds to ensure robust mechanical properties.

In addition, it has been determined that the addition of rare earth metals in the welds is an effective way to greatly benefit the impact toughness and to reduce the diffusible hydrogen content to the H5 level (i.e., wires/electrodes or flux combinations capable of depositing weld metal with a maximum diffusible hydrogen content of 5 mL/100 g), while maintaining a desired high Charpy V-notch toughness of, e.g., at least 100 ft-lbs (135.6 Joules) at −40° F. Rare earth metals can serve as trapping sites to arrest diffusible hydrogen in welds, in addition to its arc stability effect which benefits the reduction of diffusible hydrogen. The present disclosure shows that adding rare earth metals in an amount of no greater than 0.10 wt %, when combined with the addition of other components as described herein, to self-shielded flux-cored wires can effectively reduce the diffusible hydrogen down to the H5 level. It will be appreciated that rare earth oxides contain various rare earth metals including, but not limited to, Cerium (Ce), Lanthanum (La), Neodymium (Nd), Praseodymium (Pr), Scandium (Sc), and Yttrium (Y). An example list of appropriate rare earth metal oxides includes, but is not limited to, $Sc_2O_3$, $Y_2O_3$, $La_2O_3$, $Ce_2O_3$, $CeO_2$, $Nd_2O_3$, and $Pr_2O_3$.

Figure 2:
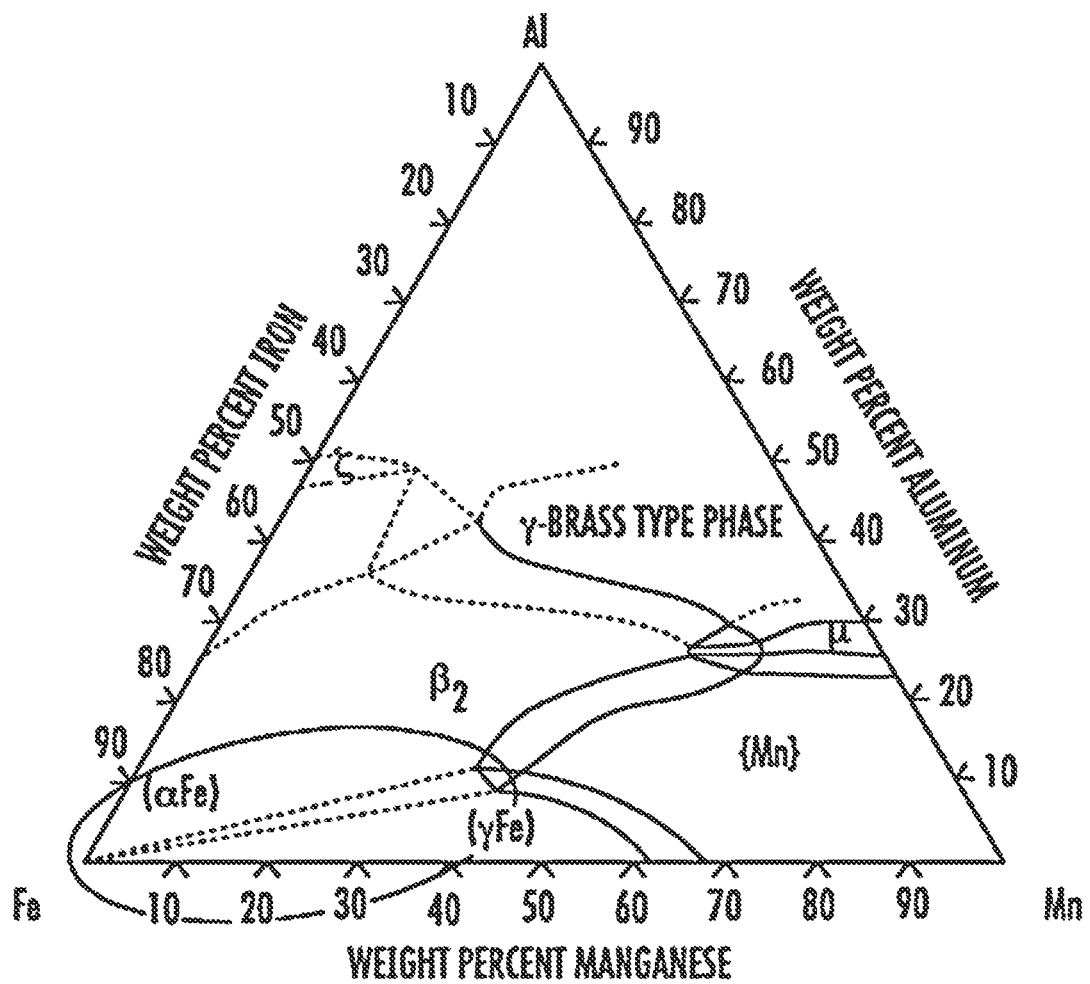
FIG. 2 is a ternary phase diagram section of Fe—Al—Mn at 1000° C.

When a large amount of aluminum is introduced into a steel weld by self-shielded flux-cored arc welding, the steel weld can be over-saturated by aluminum. According to FIG. 1, if Al content is over 1 wt % in welds, large delta ferrite grains can be inherited from the liquid solidification. Coarse grains of delta ferrite can significantly deteriorate the Charpy V-notch impact toughness. According to FIG. 2, an appropriate amount of manganese in steel can effectively expand the aluminum saturation region to promote the phase transformation from delta ferrite to austenite and alpha ferrite to result in grain refinement.

In accordance with embodiments described herein, it has been determined that providing a welding wire (e.g., a flux cored welding wire) having the following flux (e.g., flux core) ingredients in wt % per total weight of the wire provides a weld having a Charpy V-notch impact toughness at −40° F. of at least 100 ft-lbs (135.6 Joules) as well as a maximum diffusible hydrogen content of 5 mL/100 g. no greater than 1.91 aluminum, no greater than 1.02 manganese, less than 1.50 magnesium, and no greater than 0.02 rare earth metal oxide, where the rare earth metal oxide comprises at least 99 wt % cerium oxide (based upon total weight of rare earth metal oxide(s)).

The core ingredients can comprise 18 wt % to 21 wt % (e.g., 19 wt %) by total weight of the wire, while the sheath of the wire comprises a ferrous material that can comprise 79 wt % to 82 wt % by total weight of the wire. For example, the sheath can be a low carbon steel comprise substantially iron (e.g., 95 wt % or greater).

It is noted that all given ranges and values and, in particular, all weight percentage ranges and values, described herein and provided in the claims may vary by up to 2% of the specified value unless indicated otherwise. For example, a 1 wt % value can can deviate within a range of 0.98 wt % to 1.02 wt %. Accordingly, the term "about" has been omitted from the description and claims. In addition, weight percentages of core ingredients and the sheath, unless noted otherwise, are based upon total weight of the welding wire.

The amount of aluminum in the core ingredients is maintained at no greater than 1.91 wt % to ensure that Charpy V-notch impact toughness of the weld can be maintained at a desirable level. A content of Al of 1.70 wt %-1.91 wt % was found to be particularly suitable, when combined with the other core ingredients, to achieve a Charpy V-notch impact toughness at −40° F. of at least 100 ft-lbs (135.6 Joules).

The amount of manganese in the core ingredients is maintained at no greater than 1.02 wt %, and a particular suitable amount of Mn of 0.88 wt %-1.02 wt %, was determined to provide suitable features to the wire including suitable impact toughness.

The amount of magnesium in the core ingredients is maintained at less than 1.50 wt %, and a particular suitable amount of Mg of 1.27 wt %-1.48 wt %, was determined to provide suitable features to the wire including suitable impact toughness.

Other core ingredients that can be provided in the welding wire include nickel (e.g., in an amount of 0.74 wt % to 0.90 wt %), carbon (e.g., in an amount of 0.019 wt %), phosphorous (e.g., in an amount of 0.012 wt %), and sulfur (e.g., in an amount of 0.010 wt %).

One or more sintered fluorides and/or one or more sintered oxides can also be provided in the core ingredients to enhance the properties of the weld, including enhancing the impact toughness and/or hydrogen diffusion properties of the weld.

In particular, the one or more sintered fluorides can include a first sintered fluoride comprising barium fluoride ($BaF_2$) and a second sintered fluoride comprising lithium fluoride (LiF). The first sintered fluoride can be provided in the core ingredients in an amount of 9.65 wt % to 10.58 wt % (where 98.6% by weight of the first sintered fluoride may be $BaF_2$). The second sintered fluoride can be provided in the core ingredients in an amount of 0.68 wt % to 1.02 wt % (where 99.45% by weight of the second sintered fluoride may be LiF).

The one or more sintered oxides provided in the core ingredients can include one or more of lithium oxide ($Li_2O$), calcium oxide (CaO), silicon dioxide ($SiO_2$), and ferrous oxide ($Fe_3O_4$). The one or more sintered oxides can be provided in the core ingredients in an amount of 2.38 wt % to 2.95 wt %.

Adding the rare earth metal oxides in an amount no greater than 0.02 wt % in welding wires such as self-shielded flux cored wires described herein can effectively lower the diffusible hydrogen content of the weld down to an H5 level (5 mL/100 g or less) and can also help to improve impact toughness of the weld. For certain embodiments, the amount of rare earth metal oxides added as core ingredients for the welding wire can be provided in an amount of 0.009 wt %. The rare earth metal oxides comprise at least 99 wt % cerium oxide based upon total weight of rare earth metal oxides. The rare earth metal oxides can include other rare earth metals including, but not limited to, La, Nd and Pr.

An example core ingredient composition for a welding wire that provides suitable weld impact toughness and low hydrogen diffusion includes the following components at the following weight percentages (based upon the total weight of the welding wire):

TABLE 1

| Material | Weight % |
| --- | --- |
| Ni | 0.816 |
| Mg | 1.378 |
| Al | 1.803 |
| Mn | 0.947 |
| C | 0.019 |
| P | 0.012 |
| S | 0.010 |
| Sintered Oxide ($Li_2O$—CaO—$SiO_2$—$Fe_3O_4$) | 2.66 |
| First Sintered Fluoride (includes $BaF_2$) | 9.842 |
| Second Sintered Fluoride (includes LiF) | 0.850 |
| Rare Earth Oxide (substantially $CeO_2$) | 0.009 |
| Fe (forming sheath) | 80.727 |

Example Welding Wires for Testing

5/64" ESAB E71T-8 type self-shielded FCAW wire was employed to serve as a base formula for the investigation. The example flux cored wires were manufactured using cold-rolled strip (a low carbon steel) with modified core ingredient amounts as indicated. A typical weight percent or fill ratio of the flux mixes was about 19.00%. Lubricants were applied to the samples for proper manufacturing and wire feed-ability.

All welding plates were prepared at 1 G position per AWS A5.29 using the ESAB AristoMig U5000i welding machine coupled with the Feed 4804w wire feeder. For all plate welding, welding parameters used were 18.5V, 250 A, 15 centimeter-per-minute (cpm) travel speed and a ⅞" electrode extension. The same welding parameters were used to prepare chempads to determine the chemical composition of each weld. Each welding plate was subjected to a radiographic examination. After radiographic examination was satisfied, specimens for tension and Charpy V-notch (CVN) impact tests were extracted from each plate and machined per AWS A5.29. In addition, a macro sample was cut out at the middle of each plate.

After mechanical properties of the weld including tensile strength and CVN impact toughness at −40° F. were evaluated. In addition to the above, the wires were subjected to diffusible hydrogen tests per AWS A4.3. Table 2 (below) provides test results from welds formed using welding wire samples A-G formed in accordance with the invention. A further welding wire (sample H) formed including core ingredients outside of the range of the present invention (e.g., Al content at 1.95 wt %) was also tested for comparison purposes.

TABLE 2

| | Sample # | | | | | | | | |
| --- | --- | --- | --- | --- | --- | --- | --- | --- | --- |
| | A | | B | | C | | D | | E |
| chemical composition | weld | wire | weld | wire | weld | wire | weld | wire | weld |
| C | 0.06 | 0.02 | 0.06 | 0.02 | 0.06 | 0.02 | 0.06 | 0.02 | 0.06 |
| Mn | 1.05 | 1.00 | 1.06 | 1.00 | 0.99 | 0.90 | 1.03 | 1.00 | 1.10 |
| Si | 0.16 | 0.01 | 0.15 | 0.01 | 0.13 | 0.01 | 0.14 | 0.01 | 0.14 |

TABLE 2-continued

| | | | | | | | | | |
|---|---|---|---|---|---|---|---|---|---|
| P | 0.006 | 0.012 | 0.006 | 0.012 | 0.006 | 0.012 | 0.009 | 0.012 | 0.008 |
| S | 0.003 | 0.010 | 0.003 | 0.010 | 0.003 | 0.010 | 0.003 | 0.010 | 0.003 |
| Ni | 0.93 | 0.81 | 0.98 | 0.90 | 0.91 | 0.79 | 0.96 | 0.82 | 0.97 |
| Al | 1.03 | 1.85 | 0.92 | 1.82 | 0.87 | 1.79 | 0.84 | 1.70 | 1.05 |
| Mg | — | 1.279 | — | 1.338 | — | 1.363 | — | 1.399 | — |
| CeO2 | — | 0.009 | — | 0.009 | — | 0.009 | — | 0.009 | — |
| First Sintered Fluoride(BaF2) | — | 10.30 | — | 9.82 | — | 10.58 | — | 9.65 | — |
| 2nd sintered Fluoride(LiF) | — | 0.79 | — | 0.85 | — | 0.83 | — | 0.83 | — |
| Sintered Oxide(Li2O—CaO—SiO2—Fe3O4) | — | 1.71 | — | 1.58 | — | 1.74 | — | 1.52 | — |
| Sintered Oxide(Li2O—SiO2—Fe3O4) | — | 1.05 | — | 0.86 | — | 0.97 | — | 1 | — |
| CVN-40° C.(J) | 172 | | 207 | | 182 | | 198 | | 147 |
| Y.P (MPa) | 429 | | 450 | | 452 | | 455 | | 423 |
| T.S (MPa) | 521 | | 539 | | 550 | | 544 | | 523 |
| E.L (%) | 28 | | 21 | | 23 | | 26 | | 24 |
| Diffusible Hydrogen(ml/100 g) | 4.3 | | 4.7 | | 4.4 | | 3.6 | | 4.5 |

| | Sample # | | | | | | |
|---|---|---|---|---|---|---|---|
| | E | F | | G | | H | |
| chemical composition | wire | weld | wire | weld | wire | weld | wire |
| C | 0.02 | 0.06 | 0.02 | 0.06 | 0.02 | 0.07 | 0.02 |
| Mn | 1.02 | 0.96 | 0.88 | 1.01 | 0.95 | 1.05 | 0.95 |
| Si | 0.01 | 0.15 | 0.01 | 0.14 | 0.01 | 0.15 | 0.01 |
| P | 0.012 | 0.007 | 0.012 | 0.007 | 0.012 | 0.006 | 0.012 |
| S | 0.010 | 0.003 | 0.010 | 0.003 | 0.010 | 0.003 | 0.010 |
| Ni | 0.85 | 0.92 | 0.81 | 0.90 | 0.74 | 0.95 | 0.82 |
| Al | 1.91 | 0.93 | 1.85 | 1.02 | 1.75 | 1.11 | 1.95 |
| Mg | 1.479 | — | 1.387 | — | 1.311 | — | 1.270 |
| CeO2 | 0.009 | — | 0.009 | — | 0.009 | — | 0.009 |
| First Sintered Fluoride(BaF2) | 10.05 | — | 10.12 | — | 10.09 | — | 9.31 |
| 2nd sintered Fluoride(LiF) | 0.68 | — | 0.76 | — | 0.85 | — | 0.57 |
| Sintered Oxide(Li2O—CaO—SiO2—Fe3O4) | 1.82 | — | 1.64 | — | 1.82 | — | 1.52 |
| Sintered Oxide(Li2O—SiO2—Fe3O4) | 1.05 | — | 0.89 | — | 1.05 | — | 0.94 |
| CVN-40° C.(J) | | 147 | | 154 | | 245 | 59 |
| Y.P (MPa) | | 423 | | 456 | | 432 | 432 |
| T.S (MPa) | | 523 | | 542 | | 538 | 525 |
| E.L (%) | | 24 | | 23 | | 30 | 24 |
| Diffusible Hydrogen(ml/100 g) | | 4.5 | | 4.7 | | 4.4 | 4.9 |

Figure 3:
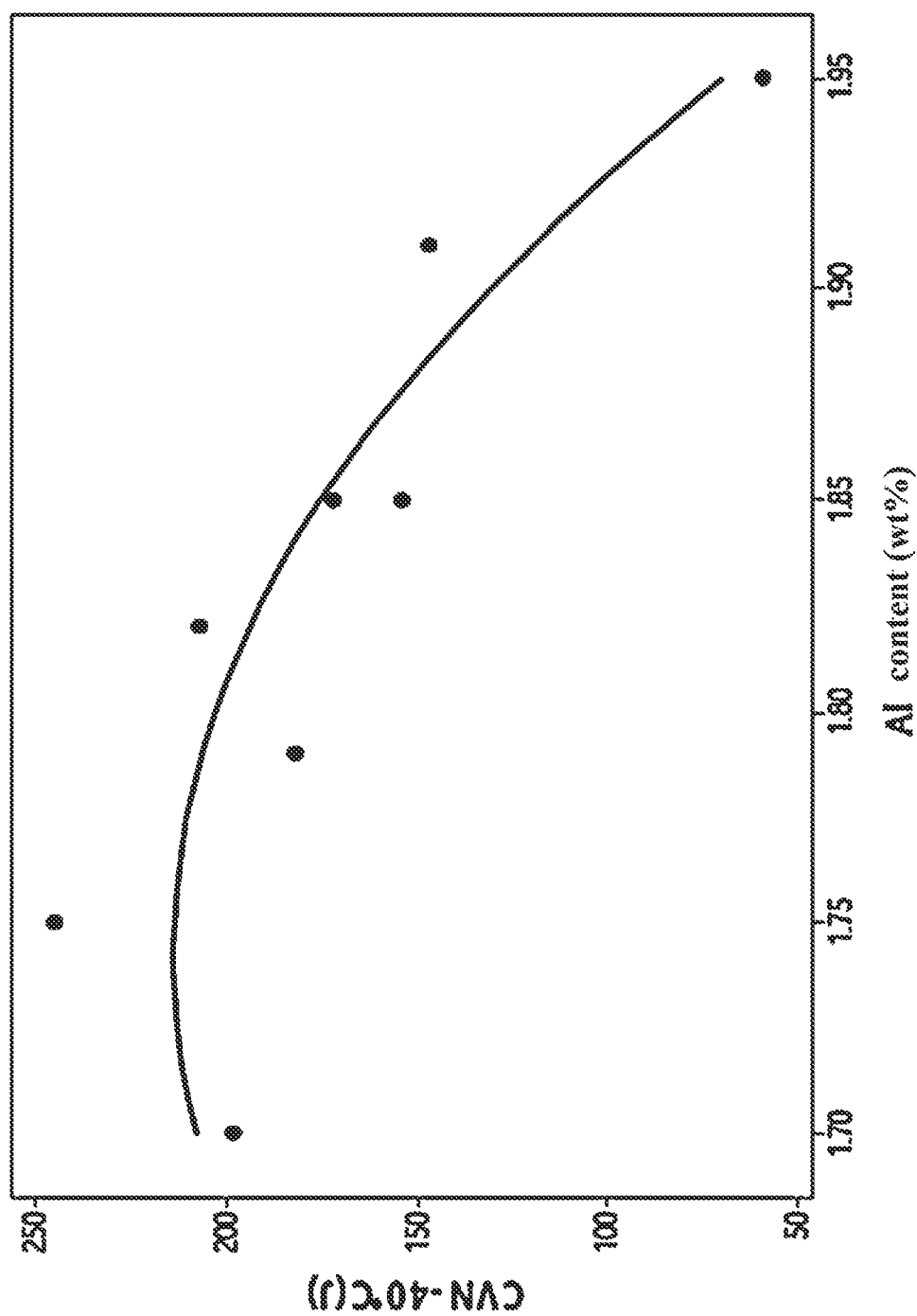
FIG. 3 is a graph showing impact toughness as a function of Al content in core ingredients of welding wire samples described in Table 2 herein.

The results show that the CVN impact toughness at −40° F. can be increased to 100 ft-lbs (135.6 Joules) level by maintaining aluminum content within the core ingredients of the welding wire to no greater than 1.91 wt %. FIG. 3 plots Al content in the core ingredients for the welding wire samples A-G (Al content within 1.70 wt %-1.91 wt %), where the resultant weld for each sample yielded a CVN impact toughness at −40° F. of greater than 100 ft-lbs (135.6 Joules). In contrast, wire sample H (having Al content of 1.95 wt %) yielded a CVN impact toughness at −40° F. of less than 100 ft-lbs. The diffusible hydrogen content for each of the wire samples A-G was also maintained at well below 5 mL/100 g.

The examples described herein and characterized in Table 2 of welding electrodes within the scope of the present disclosure show that the exemplary electrodes qualify as an H5 type self-shielded flux-cored wires, with over 100 ft-lbs (135.6 Joules) Charpy V-notch impact toughness at −400 F.

It will be appreciated that this type wire can find application in the fabrication of offshore structures, pipeline and other steel structures.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed:

1. A welding wire comprising a ferrous metal welding material and a flux material including flux ingredients, the flux ingredients comprising, in weight percent based on the total weight of the welding wire:
   1.70-1.91 aluminum;
   no greater than 1.02 manganese;
   less than 1.50 magnesium, wherein magnesium is present in the flux material; and
   no greater than 0.02 rare earth metal oxide, wherein rare earth metal oxide is present in the flux material;
   wherein the rare earth metal oxide comprises at least 99 wt % cerium oxide based upon total weight of rare earth metal oxide.

2. The welding wire of claim 1, wherein the welding wire comprises a flux cored welding wire, the metal welding material comprises a metal sheath, and the flux material comprises a flux core within the metal sheath.

3. The welding wire of claim 1, wherein the flux ingredients further comprise, in weight percent based on the total weight of the welding wire, less than 1.0 nickel.

4. The welding wire of claim 1, wherein the flux ingredients further comprise, in weight percent based on the total weight of the welding wire:
   0.88-1.02 manganese; and
   1.27-1.48 magnesium.

5. The welding wire of claim 4, wherein the flux ingredients further comprise, in weight percent based on the total weight of the welding wire:
   0.74-0.90 nickel.

6. The welding wire of claim 1, wherein the flux ingredients further comprise, in weight percent based on the total weight of the welding wire:
2.38-2.95 of one or more sintered oxides.

7. The welding wire of claim 6, wherein the one or more sintered oxides comprise one or more of lithium oxide ($Li_2O$), calcium oxide (CaO), silicon dioxide ($SiO_2$), and ferrous oxide ($Fe_3O_4$).

8. The welding wire of claim 1, wherein the flux ingredients further comprise one or more sintered fluorides.

9. The welding wire of claim 8, wherein the one or more sintered fluorides comprises a first sintered fluoride comprising barium fluoride, and the first sintered fluoride is provided in the flux ingredients, in weight percent based on the total weight of the welding wire, in an amount of 9.65-10.58.

10. The welding wire of claim 9, wherein the one or more sintered fluorides comprises a second sintered fluoride comprising lithium fluoride, and the second sintered fluoride is provided in the flux ingredients, in weight percent based on the total weight of the welding wire, in an amount of 0.68-1.02.

11. The welding wire of claim 1, wherein the flux ingredients further comprise, in weight percent, based on the total weight of the welding wire:
0.816 nickel;
1.378 magnesium;
1.803 aluminum;
0.947 manganese; and
0.009 rare earth metal oxide.

12. A flux composition for a welding wire, the flux composition comprising, in weight percent based on the total weight of the welding wire:
1.70-1.91 aluminum;
no greater than 1.02 manganese;
less than 1.50 magnesium, wherein magnesium is present in the flux material; and
no greater than 0.02 rare earth metal oxide, wherein rare earth metal oxide is present in the flux material;
wherein the rare earth metal oxide comprises at least 99 wt % cerium oxide based upon total weight of rare earth metal oxide.

13. The flux composition of claim 12, further comprising, in weight percent based on the total weight of the welding wire, less than 1.0 nickel.

14. The flux composition of claim 12, further comprising, in weight percent based on the total weight of the welding wire:
0.88-1.02 manganese; and
1.27-1.48 magnesium.

15. The flux composition of claim 14, further comprising, in weight percent based on the total weight of the welding wire:
0.74-0.90 nickel.

16. The flux composition of claim 12, further comprising, in weight percent based on the total weight of the welding wire:
2.38-2.95 of one or more sintered oxides.

17. The flux composition of claim 16, wherein the one or more sintered oxides comprise one or more of lithium oxide ($Li_2O$), calcium oxide (CaO), silicon dioxide ($SiO_2$), and ferrous oxide ($Fe_3O_4$).

18. The flux composition of claim 12, further comprising one or more sintered fluorides.

19. The flux composition of claim 18, wherein the one or more sintered fluorides comprises a first sintered fluoride comprising barium fluoride, and the first sintered fluoride is provided, in weight percent based on the total weight of the welding wire, in an amount of 9.65-10.58.

20. The flux composition of claim 19, wherein the one or more sintered fluorides comprises a second sintered fluoride comprising lithium fluoride, and the second sintered fluoride is provided, in weight percent based on the total weight of the welding wire, in an amount of 0.68-1.02.

21. The flux composition of claim 12, further comprising, in weight percent based on the total weight of the welding wire:
0.816 nickel;
1.378 magnesium;
1.803 aluminum;
0.947 manganese; and
0.009 rare earth metal oxide.

* * * * *